United States Patent [19]
Villata

[11] Patent Number: 5,655,638
[45] Date of Patent: Aug. 12, 1997

[54] CLUTCH MODULE WITH RESILIENT GRIPPING OF THE DIAPHRAGM, AND A CORRESPONDING MECHANISM

[75] Inventor: Gino Villata, Buttigliera D'Asti, Italy

[73] Assignee: Valeo, Paris, France

[21] Appl. No.: 481,462

[22] PCT Filed: Nov. 8, 1994

[86] PCT No.: PCT/FR94/01301

§ 371 Date: Jul. 10, 1995

§ 102(e) Date: Jul. 10, 1995

[87] PCT Pub. No.: WO95/13482

PCT Pub. Date: May 18, 1995

[30] Foreign Application Priority Data

Nov. 9, 1993 [FR] France ................... 93 13337

[51] Int. Cl.$^6$ ..................... F16D 13/71; F16D 13/50
[52] U.S. Cl. ........................ 192/70.18; 192/89.23
[58] Field of Search ................. 192/70.18, 200, 192/89.23, 70.17, 70.16, 70.28

[56] References Cited

U.S. PATENT DOCUMENTS

| | | | |
|---|---|---|---|
| 3,939,951 | 2/1976 | Sink et al. | 192/89.23 |
| 4,084,674 | 4/1978 | De Gennes | 192/89.23 |
| 4,666,024 | 5/1987 | Blond et al. | 192/89.23 X |
| 5,236,070 | 8/1993 | Simoncic et al. | |

FOREIGN PATENT DOCUMENTS

| | | |
|---|---|---|
| 1398339 | 8/1965 | France. |
| 2546999 | 12/1984 | France. |
| 2927424 | 1/1981 | Germany. |
| 1187365 | 4/1970 | United Kingdom. |

*Primary Examiner*—Rodney H. Bonck
*Attorney, Agent, or Firm*—Longacre & White

[57] ABSTRACT

A clutch module having tongues interposed between a pressure plate and a cover plate. Associated with a diaphragm are resilient grippers which permanently bias the diaphragm toward engagement with the cover plate. The resilient grippers are divided into sectors which are fixed, at each of their circumferential ends, both circumferentially and axially to the cover plate to define an integral tongue.

13 Claims, 2 Drawing Sheets

CLUTCH MODULE WITH RESILIENT GRIPPING OF THE DIAPHRAGM, AND A CORRESPONDING MECHANISM

This invention relates to clutch modules, especially for motor vehicles.

As is known, a clutch module is a unit which comprises a mechanism, a clutch friction wheel and a flywheel, the mechanism itself comprising a cover plate by which it is attached on the flywheel, a diaphragm which bears on the cover plate, and a pressure plate on which the diaphragm bears, with, interposed between the pressure plate and the cover plate, tongues which couple the pressure plate to the cover plate for rotation with it, while allowing it some degree of axial mobility with respect to the latter.

More particularly, the invention is directed to the case in which there are, also associated with the diaphragm, resilient gripping means which permanently bias the diaphragm towards its primary engagement on the cover plate.

Usually, the said resilient gripping means simply consist of an elastic ring which bears on lugs that project from the cover plate and embrace the diaphragm through openings which exist at the root of its radial fingers.

Because these very lugs have to be formed and bent, manufacture necessitates the use of specific tooling.

In the document DE-A-2 927 424, the resilient gripping means comprise an annular member which, bearing on the cover plate at its periphery of greatest diameter, engages on the diaphragm in the vicinity of its periphery having the smallest diameter.

For the engagement and fastening of this annular member on the cover plates, it is necessary to carry out a blanking and forming operation on at least part of the side wall of the latter, which accordingly carries the penalty that manufacture is complicated.

An object of the invention is to provide a clutch module of the kind having tongues between the pressure plate and the cover plate, and having resilient gripping means associated with the diaphragm, as described above, which has the advantage of affording great simplicity of manufacture.

This clutch mechanism is characterised in that the resilient gripping means of the diaphragm are divided into at least two sectors, which are secured to the cover plate, both circumferentially and axially, at each of their circumferential ends, and each of which defines an integral tongue.

Supplementary advantage is thus taken of the components constituting the resilient gripping means for the diaphragm, giving the benefit of simplified arrangements as regards both manufacture and fitting.

For example, for securing them to the cover plate, the sectors that constitute these components are gripped between the cover plate and the flywheel, in conjunction with centring and/or rotational coupling.

As a result, the arrangement is greatly simplified, both in manufacture, in which no pressing-out of the side wall of the cover plate is necessary, and in fitting, in which connection, fitting consists in this case of a simple stacking operation.

If special fastening means are interposed between the cover plate and the sectors by way of modification, the mechanism may have the advantage that it forms a unitary sub-assembly, by itself if desired, and this also facilitates fitting.

Such a mechanism constitutes a further objective of the present invention.

The objects of the invention and their features and advantages will appear more clearly from the description that follows by way of example, with reference to the attached diagrammatic drawings, in which.

Figure 1:
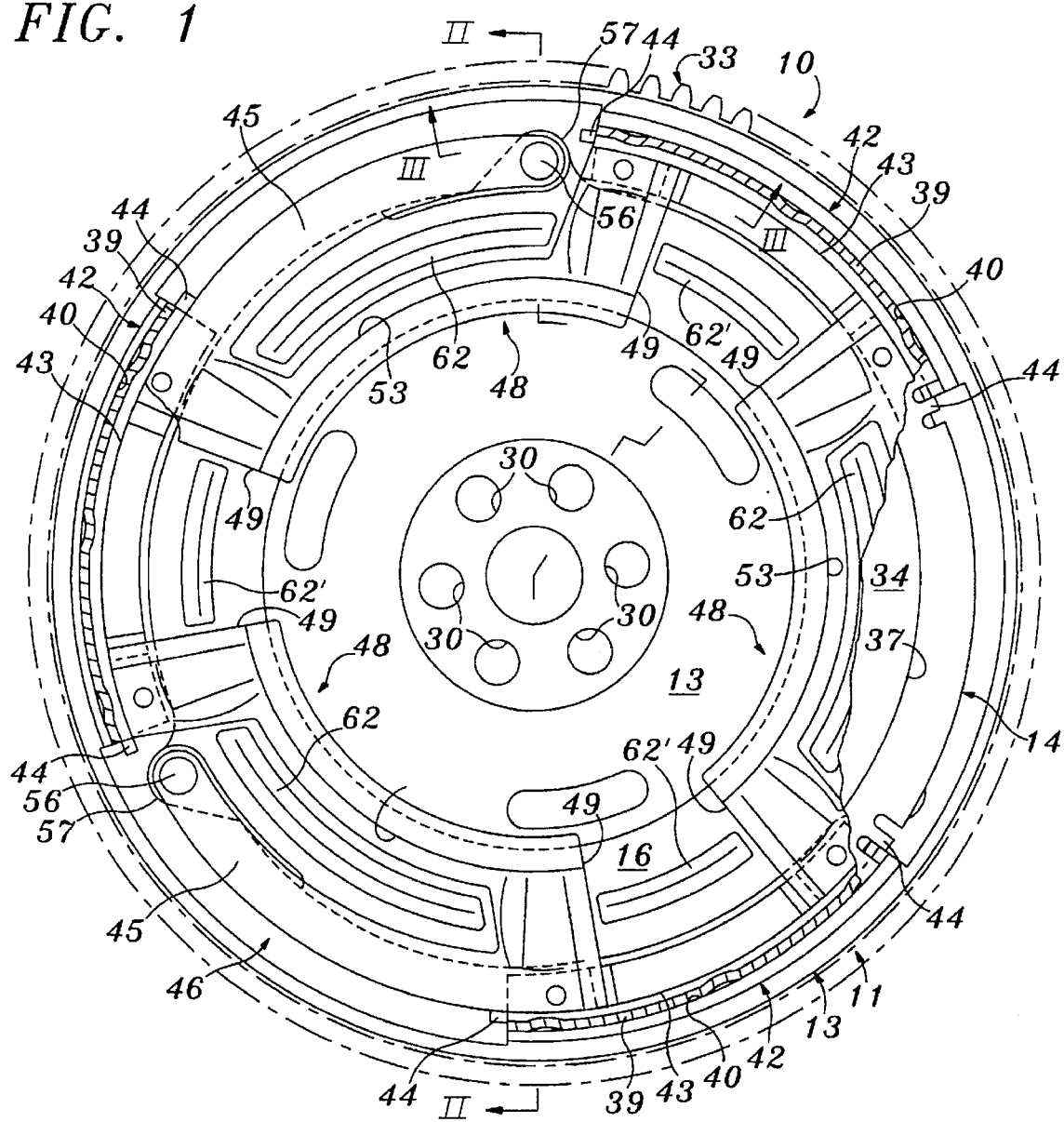
FIG. 1 is a view in elevation of a clutch module in accordance with the invention, shown locally cut away.

As is shown in the drawings, the clutch module 10 in accordance with the invention comprises, in axial succession and in a manner known per se, a mechanism 11, a clutch friction wheel 12 and a flywheel 13.

The mechanism 11 itself comprises, in axial succession, a cover plate 14 which in this example is a sheet metal pressing and which, as is described later herein, is attached to the flywheel 13, a diaphragm 15 which bears on the cover plate 14, and a pressure plate 16 on which the diaphragm 15 bears.

In this example, the mechanism is of the "push to release" type.

The diaphragm 15 therefore engages on the cover plate 14 on the side having the smaller diameter of the periphery of its peripheral portion 18 which defines a Belleville ring, while it bears on the pressure plate 16 on the side of the periphery of the latter having the larger diameter.

Under the biassing effect of the diaphragm 15, the pressure plate 16 is adapted to hold against the flywheel 13, which constitutes a reaction plate, the friction liners 20 of the friction disc 19 which is part of the clutch friction wheel 12.

Figure 2:
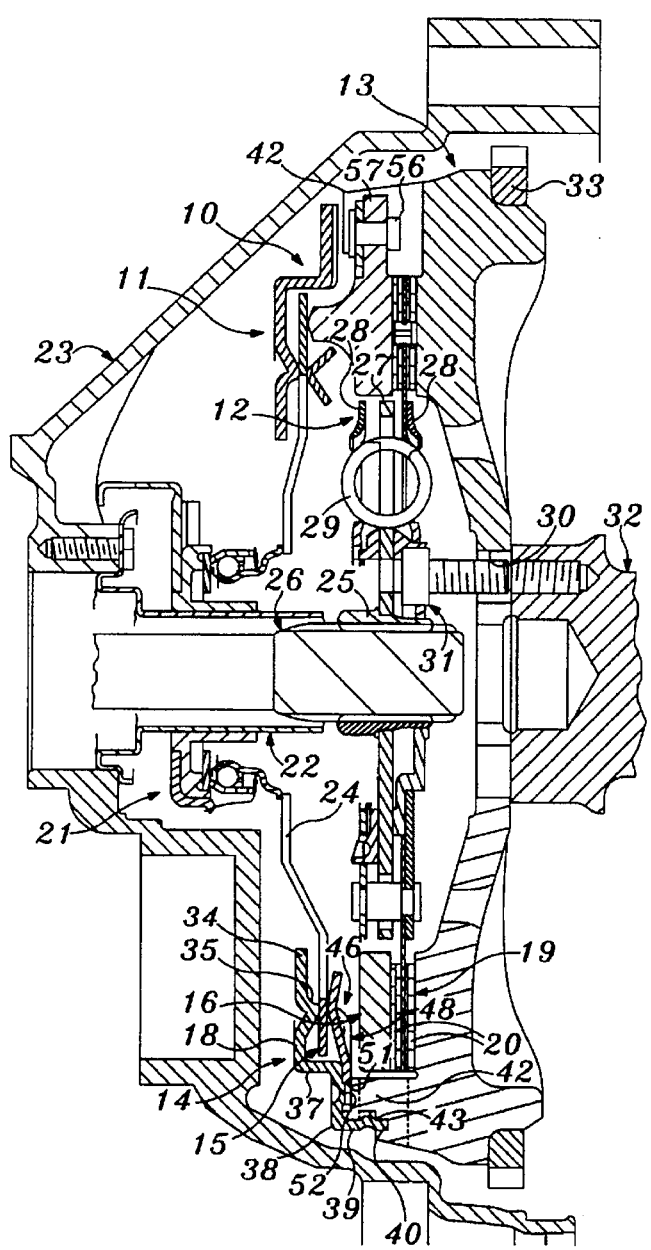
FIG. 2 is a view of the same, in axial cross section taken on the broken line II—II in FIG. 1, with the other components with which it cooperates shown in FIG. 2 in fine lines.

For release of the said friction liners 20, a clutch release bearing 21 is provided, which is shown in fine lines in FIG. 2 and which, being mounted for axial sliding movement on a sleeve 22 which is fixed to the casing 23 of the assembly, is adapted to exert a thrust on the fingers 24 which constitute the central portion of the diaphragm 15.

In this example, the clutch friction wheel 12 has a damping hub.

Besides a hub 25, by which it is adapted to be mounted in rotation on a driven shaft 26, which in this example is the output shaft of the gearbox, and a damper plate 27 which is fixed, in this example by seaming, to the hub 25, it comprises two guide rings 28, which lie respectively on either side of the damper plate 27 and to which the friction disc 19 is secured, with circumferentially acting resilient means, which in this example are springs 29 of the coil spring type, being interposed circumferentially between the damper plate 27 and the said guide rings 28, with each of these springs being located individually, partly in a window of the damper plate 27 and partly in windows of the guide rings 28.

The friction disc 19 is attached to one of the guide rings 28, being secured to the latter by means of short bars which secure this guide ring 28 to the other one.

In this example, the flywheel 13 is of integral form, being of a mouldable material like the pressure plate 16, and being in this example a casting.

In its central part it has a plurality of holes 30 which are spaced apart along a circle, for accommodating fastening screws 31 for attaching the assembly on to a driving shaft 32, which in this example is the crankshaft of an internal combustion engine. It carries a starter crown 33 at its periphery.

In this example, the cover plate 14 of the mechanism 11 includes a transverse base portion 34 of annular shape, which in the present example includes a ring-shaped bead 35, in this example formed by pressing, by means of which it provides a primary abutment for the peripheral portion 18 of the diaphragm 15 that defines the Belleville ring.

The cover plate 14 further includes a peripheral side wall 37, by means of which it surrounds the diaphragm 15, and which in this example is generally cylindrical with a circular profile in transverse cross section.

The cover plate then includes a transverse flange portion 38 which extends radially away from the base portion 34, and through which it bears axially on the flywheel 13.

In this example, the cover plate 14 finally includes lugs 39 for its attachment to the flywheel 13, these being spaced apart on a circle and projecting from the periphery of its flange portion 38 having the larger diameter, to extend generally axially, with each of these lugs being in engagement through its edge, so as to protect the lug from centrifugal forces in use, with retaining grooves 40 which are provided for this purpose along a circle on the flywheel 13 in the region of the periphery of the latter having the larger diameter.

In this example, three lugs 39 are provided on the cover plate 14, with an equal number of retaining grooves 40 on the flywheel 13 on a common pitch circle.

In this example, the flywheel 13 has bosses 42, at the rate of one boss per retaining groove 40, the bosses projecting axially towards the cover plate 14, bounding its retaining grooves 14 and being elongated circumferentially, generally being included in a crown which is interrupted locally from place to place for reasons which will appear later on herein, with the lugs 39 of the cover plate 14 being engaged back-to-back with the bosses.

It is on these bosses 42, which are located on a common transverse level, that the cover plate 14 bears axially through its flange portion 38.

In this example, each of the bosses 42 of the flywheel 13 has on its outer lateral surface a hollow seaming groove 43 into which, in this example, though this is not mandatory, the lugs 39 of the cover plate 14 are deformed from place to place by press-forming, in order to provide, or increase, the axial fastening of the said cover plate 14 to the flywheel 13.

In order to prevent the cover plate 14 from rotating on the flywheel 13, there are provided, in this example, tongues 44 which project from the flange portion 38 of the cover plate 14 and which are accordingly of metal, being arranged on either side of each of its lugs 39 and being bent at right angles into contact with the circumferential ends of the bosses 42 of the flywheel 13.

Between the pressure plate 16 and the cover plate 14, there are interposed from place to place, as will be described later herein, tongues 45, which, being arranged generally transversely with respect to the axis of the assembly and being spaced apart circumferentially around the latter, are resiliently deformable in the axial direction and secure the pressure plate 16 to the cover plate 14 for rotation with it, while allowing it some degree of axial mobility with respect to the latter, while in combination with the foregoing, resilient gripping means 46 are associated with the diaphragm 15 and permanently bias the diaphragm 15 towards its engagement on the cover plate 14, by bearing on the diaphragm 15 on the side of the latter opposite to the bead 35 of the cover plate 14.

In accordance with the invention, these resilient gripping means 46 are divided into at least two sectors 48, which are fixed, at each of their circumferential ends, to the cover plate 14 both circumferentially and axially, with each sector defining a tongue 45 integrally with it.

In this example, the clutch module 10 has three sectors 48 spaced apart regularly in the circumferential direction, and these are of metal.

In this example, these sectors 48 have at each of their circumferential ends a widened portion 49 which extends generally in the radial direction away from the axis of the assembly, and by means of which, in FIGS. 1 to 9, they are gripped between the cover plate 14 and the flywheel 13.

Accordingly, it is through the sectors 48 that the cover plate 14 bears axially on the flywheel 13, and more precisely on the axially orientated bosses 42 of the flywheel 13.

Figure 4:
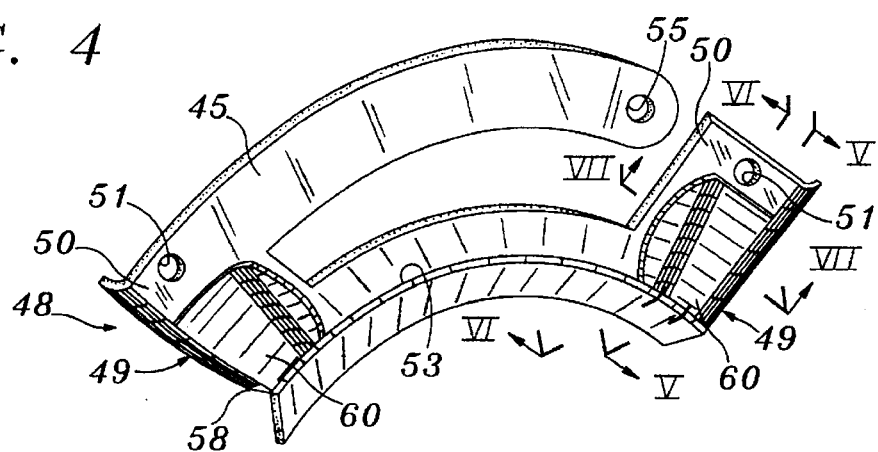
FIG. 4 is a perspective view on a larger scale of one of the sectors employed in accordance with the invention in the said clutch module.
Figure 5:
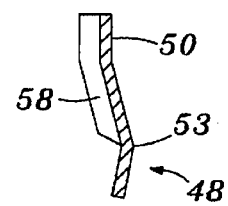
FIGS. 5, 6 and 7 are partial views in cross section of the same sector, in cross section on the lines V—V, VI—VI and VII—VII respectively in FIG. 4.
Figure 6:
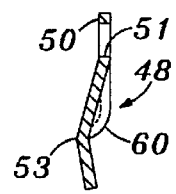
Figure 7:
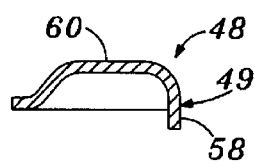

In this example, FIGS. 4 and 5, the sectors 48 have at each of their circumferential ends, on a flat portion 50 of their corresponding widened portion 49, and in the region of their radially outermost peripheral edge, a hole 51 in which is engaged a member for centring and/or coupling in rotation, with respect to the cover plate 14.

In FIGS. 1 to 7 there is a boss portion 52, having a complementary profile and formed integrally with the flange portion 38 of the cover plate 14.

Thus, the sectors 48 are attached circumferentially to the cover plate 14, while they are at the same time attached to it axially by virtue of being gripped between the cover plate 14 and the flywheel 13.

In the region of their radially innermost peripheral edge, the sectors 48 have a circular edge 53, made by press-forming in order to provide a secondary abutment to the diaphragm 15 corresponding to the bead 35 of the cover plate 14, this edge being preferably rounded in consequence.

The tongues 45, each of which forms a part, individually, of the sectors 48, is cantilevered integrally from one of their widened portions 49, being continuous with the flat portion 50 of the latter.

In this example this tongue 45 extends over an arc of a circle and over a substantial length.

At its free end it has a hole 55 for securing it, by means of a rivet 56, to one of the radial lugs 57 with which the pressure plate 16 is provided at its outer periphery for this purpose.

The lugs 57 of the pressure plate 16 extend radially between the bosses 42 of the flywheel 13.

In this example, at least one of their circumferential ends, and in this example at each of these ends, the sectors 48 are stiffened, along at least part of the length of their radial edges, by a turned edge 58 which is, however, not indispensible.

Again for stiffening the sectors 48, these preferably have at least one press-formed deformation 60 in at least one of their circumferential ends.

In this example, they have a single deformation 60 at each of their circumferential ends, extending generally over the whole of the corresponding widened portion 49 between the flat portion 50 of the latter and the edge 53.

In this example, this deformation 60 extends towards the pressure plate 16.

Thanks to these deformations 60, and in cooperation with the turned edges 58 if these are provided, the thickness of the sectors 48 can with advantage be reduced, which favours good elasticity of the tongues 45 defined by them.

Each of the sectors 48 constructed in this way is formed for example by blanking out and press-forming from metal sheet of any kind.

For engagement of the diaphragm 15, the pressure plate 16 has projecting bosses 62, 62', all of which extend lengthwise over a common circumference, and which are alternately long and short.

In this example, each of the sectors 48 penetrates into one long boss 62 and one short boss 62', by each of its widened portions 49, while, by virtue of its tongue 45, each sector forms a U-shaped enclosure around one long boss 62.

Figure 8:
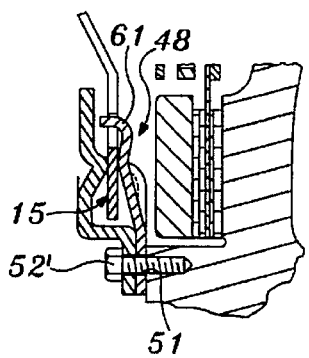
FIG. 8 is a partial view in axial cross section, similar to FIG. 2 and showing a modified embodiment.
Figure 3:
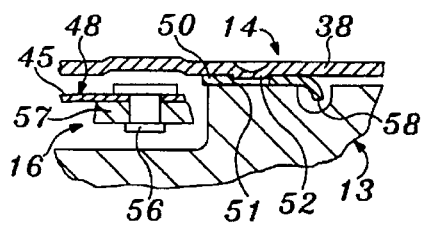
FIG. 3 is a partial view of the same, developed in the flat and in circumferential cross section taken on the line III—III in FIG. 1.
Figure 9:
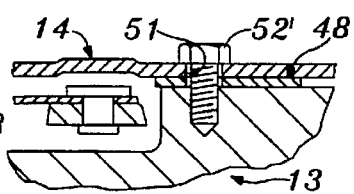
FIG. 9 is a view in partial circumferential cross section, similar to that in FIG. 3 but for the said modified embodiment.

In the modified embodiment shown in FIGS. 8 and 9, at least one of the sectors 48, and in practice each of these latter, has, projecting radially along its radially innermost peripheral edge, at least one tongue 61 which is bent in the form of a crook towards the diaphragm 15, and which is engaged in one of the passages included in the latter at the root of its radial fingers, for the purpose of centring the diaphragm and/or preventing it from rotating.

In this modified embodiment, the cover plate 14 is fixed on the flywheel 13 by means of screws 52', which extend through the sectors 48 via their holes 51 and which, in conjunction therewith, provide centring for the latter and prevent them from rotating, in place of the boss portions 52 of the previous embodiment.

Figure 10:
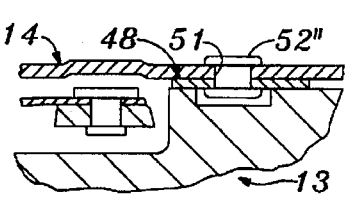
FIG. 10 is a partial view in circumferential cross section, similar to FIG. 3 but for another modified embodiment.

In the modified embodiment shown in FIG. 10, the sectors 48 are fixed to the cover plate 14 by special fastening means 52", such as rivets as shown, for example, fitted in their holes 51.

The cover plate 14, the diaphragm 15 and the sectors 48 accordingly form, to advantage, a unitary sub-assembly. The same is true for the mechanism 11 if, at the same time, the pressure plate 16 is duly secured by rivets 56 to the tongues 45 of the sectors 48.

The present invention is of course not limited to the embodiments described and shown, but embraces all practical variants, and/or all combinations of their various elements, especially as regards the assembly means by which the cover plate is fixed to the flywheel.

In addition, instead of being a single component, the flywheel could be in two parts.

It will be appreciated that the size of arrangement in accordance with the invention is not large in the radial direction, and that the casing 23 may come very close (FIG. 2) to the peripheral bosses 42 of the flywheel 13, which are readily formed by casting.

I claim:

1. A clutch module of the kind comprising a mechanism (11), a clutch friction wheel (12) and a flywheel (13), said mechanism (11) itself comprising a cover plate (14) by which it is attached on the flywheel (13), a diaphragm (15) which bears on the cover plate (14), and a pressure plate (16) on which the diaphragm (15) bears, with, interposed between the pressure plate (16) and the cover plate (14), a plurality of tongues (45) which couple the pressure plate (16) to the cover plate (14) for rotation with it, while allowing it some degree of axial mobility with respect to the latter, and, associated with the diaphragm (15), resilient gripping means (46) which permanently bias the diaphragm (15) towards its engagement on the cover plate (14), wherein the resilient gripping means (46) are divided into at least two sectors having circumferential ends which are secured to the cover plate (14), both circumferentially and axially, and each of said sectors defines one of said tongues (45).

2. A clutch module according to claim 1, wherein the sectors (48) are gripped at each of their circumferential ends between the cover plate (14) and the flywheel (13).

3. A clutch module according to claim 2, wherein, with the cover plate (14) having a transverse flange portion (38) for its axial engagement on the flywheel (13), the sectors (48) have, at each of their circumferential ends and in the vicinity of their radially outermost peripheral edge, a hole (51) in which is engaged a member for centring and coupling in rotation, having a complementary profile and formed integrally with said flange portion (38), screw (52') or rivet (52").

4. A clutch module according to claim 1, wherein, at least one of said circumferential ends having a radial edge, the sectors (48) are stiffened by a turned edge (58) extending along at least part of the length of their radial edges.

5. A clutch module according to claim 1, wherein, in the vicinity of their radially innermost peripheral edge, the sectors (48) have an arcuate edge (53) for contact with the diaphragm (15).

6. A clutch module according to claim 1, wherein, at least one of their circumferential ends, the sectors (48) have at least one press-formed deformation (60).

7. A clutch module according to claim 1, wherein, at each of their circumferential ends, the sectors (48) have a widened portion (49) which extends generally radially, and the tongue (45) thereof is cantilevered integrally from a said widened portion (49).

8. A clutch module according to claim 1, wherein, along its radially innermost peripheral edge, at least one of the sectors (48) has a projecting tongue (61) for centring the diaphragm (15) and for preventing it from rotating.

9. A clutch module according to claim 1, wherein the tongue (45) defined by each of the sectors (48) extends over an arc of a circle.

10. A clutch module according to claim 1, wherein, said pressure plate comprises projecting bosses for engagement with said diaphragm, and each of said sectors defines a U-shaped enclosure around one of said bosses.

11. A clutch module according to claim 1, wherein said clutch module includes at least three sectors (48) spaced apart on a circle.

12. A clutch module according to claim 1, wherein, with fastening means (52") securing the sectors (48) to the cover plate (14), the cover plate (14), the diaphragm (15) and the sectors (48) constitute a unitary sub-assembly.

13. A clutch module according to claim 12, wherein, the pressure plate (16) being fixed to the tongues (45), the mechanism (11) constitutes a unitary sub-assembly.

* * * * *